United States Patent
Sakaguchi et al.

(10) Patent No.: US 7,831,092 B2
(45) Date of Patent: Nov. 9, 2010

(54) COLOR CORRECTION METHOD AND COLOR CORRECTION DEVICE APPLIED TO COLOR SIGNAL VECTOR USING CORRECTION MATRIX

(75) Inventors: Takaaki Sakaguchi, Tokyo (JP); Tooru Aoki, Tokyo (JP); Narihiro Matoba, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 1004 days.

(21) Appl. No.: 11/628,842

(22) PCT Filed: Nov. 25, 2004

(86) PCT No.: PCT/JP2004/017481

§ 371 (c)(1),
(2), (4) Date: Dec. 8, 2006

(87) PCT Pub. No.: WO2006/057037

PCT Pub. Date: Jun. 1, 2006

(65) Prior Publication Data

US 2008/0007657 A1    Jan. 10, 2008

(51) Int. Cl.
*G06K 9/00* (2006.01)

(52) U.S. Cl. ..................... 382/167; 348/708
(58) Field of Classification Search ............. 382/162, 382/167; 348/708
See application file for complete search history.

(56) References Cited

U.S. PATENT DOCUMENTS

| 5,444,496 A | * | 8/1995 | Gehrmann | ............. 348/587 |
|---|---|---|---|---|
| 5,552,904 A | | 9/1996 | Ryoo et al. | |
| 5,726,682 A | | 3/1998 | Lum et al. | |
| 5,995,165 A | | 11/1999 | Oh | |
| 6,055,335 A | * | 4/2000 | Ida et al. | ............. 382/232 |
| 6,147,772 A | | 11/2000 | Pritchett | |
| 2003/0193579 A1 | | 10/2003 | Mori et al. | |

FOREIGN PATENT DOCUMENTS

| JP | 11-341507 A | 12/1999 |
|---|---|---|
| JP | 2001-061160 A | 3/2001 |
| JP | 2001-359114 A | 12/2001 |
| JP | 2002-027490 A | 1/2002 |
| JP | 2002-044679 A | 2/2002 |
| JP | 2002-176656 A | 6/2002 |

* cited by examiner

*Primary Examiner*—Vikkram Bali
*Assistant Examiner*—Eueng-Nan Yeh
(74) *Attorney, Agent, or Firm*—Birch, Stewart, Kolasch & Birch, LLP

(57) ABSTRACT

In a color correction method of performing correction by dividing the color plane into a plurality of areas, and correcting the color according to different methods for each divided area, color shifts generated in converting color signal vectors are prevented from arising.

When determining which area of the color signal plane divided by area boundary lines passing through the origin of the color signal plane includes the input color signal vector, and correcting the input color signal vector by converting the input color signal vector using a correction matrix having been designated in advance for the area determined to include the input color signal vector, a correction matrix including a component for performing parallel translation and a component for performing linear transformation is used as a correction matrix.

4 Claims, 3 Drawing Sheets

| EXPRESSIVE FORM | SATURATION |
|---|---|
| YUV | $\sqrt{U^2+V^2}$ |
| L*a*b* | $\sqrt{a^{*2}+b^{*2}}$ |
| L*u*v* | $\sqrt{u^{*2}+v^{*2}}$ |
| HSV | S |

COLOR CORRECTION METHOD AND COLOR CORRECTION DEVICE APPLIED TO COLOR SIGNAL VECTOR USING CORRECTION MATRIX

TECHNICAL FIELD

The present invention relates to technologies for correcting colors of images, and particularly to a color correction method of performing appropriate correction for each of predetermined color areas, and to a device therefor.

BACKGROUND ART

In imaging devices including digital cameras, single-plate CCDs are generally used. Color filters are placed over the entire CCDs, and color images are obtained by interpolating the colors. Spectral sensitivity characteristics of the color filters are different among colors, and human-beings have characteristics to prefer vivid colors in their memory to actual colors with respect to green of trees or blue of the sky, so that color correction is performed to obtain desired colors (memorized colors).

Generally, as a color correction method, the colors based on RGB signals or YCbCr signals of image data are divided into areas, and then the signals are amplified according to gains predetermined for each area in advance, or are computed according to color correction matrices, to perform color correction. In a specific example of such a color correction method, as described in Patent document 1, in the color difference signal plane, firstly, the hues are divided into a plurality of areas by area boundary lines passing through the origin, and the position vector of an input color difference signal is divided into two vector components along neighboring area boundary lines. In addition, the vectors along the area boundary lines are linearly transformed by a transformation matrix, to perform color conversion, whereby the color correction is performed only for hues within an arbitrary area among the entire hue area.

[Patent document 1] Japanese Patent Laid-Open No. 176656/2002, "COLOR CORRECTION CIRCUIT"
[Patent document 2] Japanese Patent Laid-Open No. 115588/2000, "IMAGING DEVICE, IMAGING DEVICE CONTROL METHOD, AND STORAGE MEDIUM THEREFOR"

DISCLOSURE OF THE INVENTION

Problem that the Invention is to Solve

However, a problem is known that, in such a method, variation such as variation of lens and variation in spectral sensitivity characteristics of image capture elements causes color variation even after white balance adjustment as described in Patent document 2. As a result, color shifts arise, and colors that are originally achromatic colors such as gray and while would take on colors in shifted directions. For this reason, in the conventional color correction method, a problem has been that the color shifts are emphasized.

The present invention aims to resolve such a problem, and the color correction is performed so that the color shifts are corrected by providing parallel translation components included in a correction matrix for correcting the color shifts, and then the correction is performed so that the colors can be corrected selectively for each area, and the color can gradually vary from the area boundaries.

Means for Solving the Problem

A color correction method of correcting a color signal vector, relevant to the present invention, includes the steps of: determining to which area of a color signal plane divided by area boundary lines passing through the origin of the color signal plane an inputted color signal vector belongs; and converting the color signal vector using a correction matrix having been designated in advance with respect to the area determined to include the color signal vector; and a correction matrix including a component for performing parallel translation and a component for performing linear transformation is used as the correction matrix.

EFFECTS OF THE INVENTION

As described above, according to the color correction method relevant to the present invention, the matrix is configured such that, in conversion for performing color correction, in addition to a component for performing linear transformation, a component for performing parallel translation is included, so that conversion that prevents color shifts can be performed.

DESCRIPTION OF THE SYMBOLS

Figure 1:
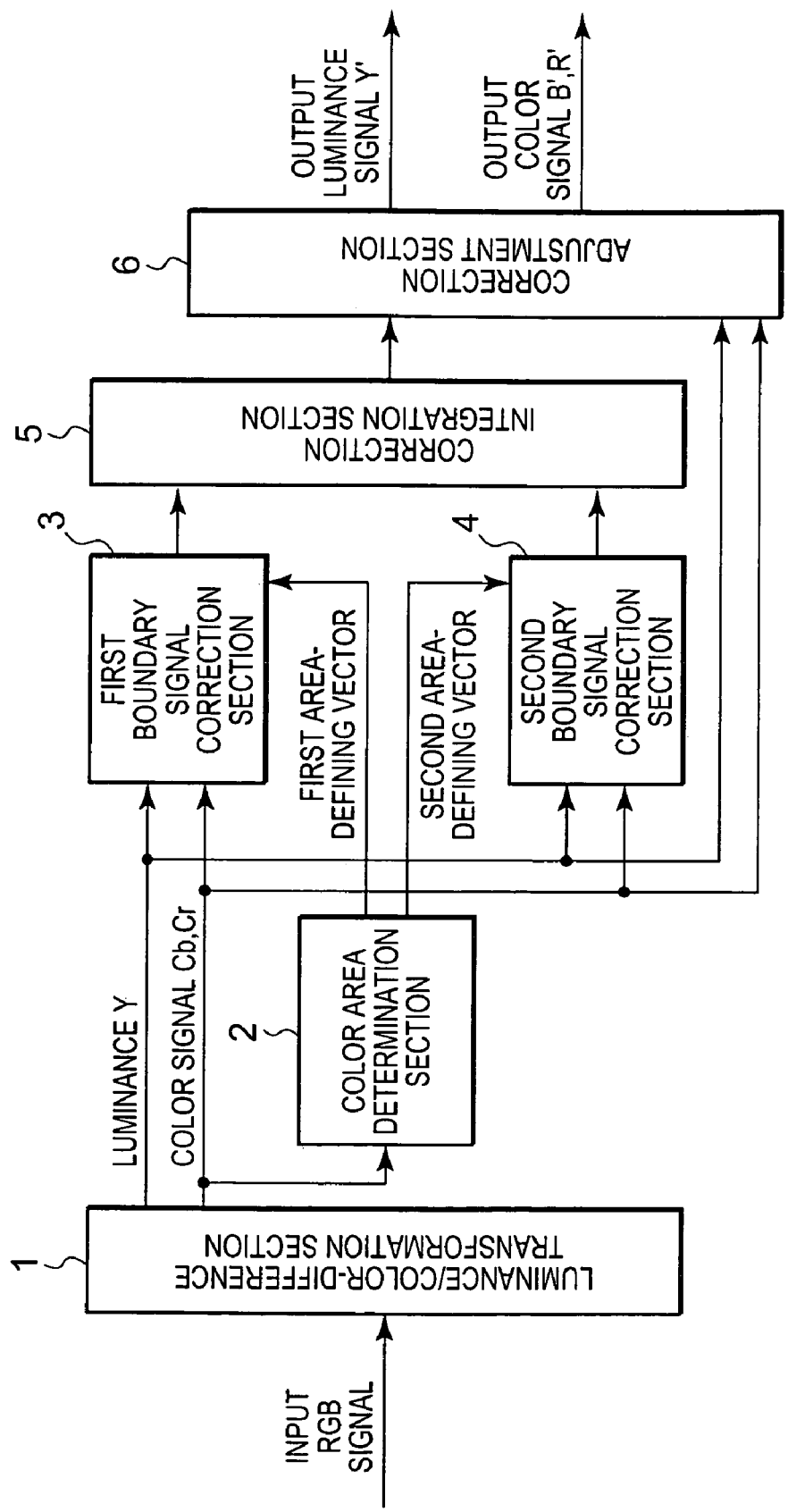
FIG. 1 is a block diagram illustrating the configuration of a color correction device according to Embodiment 1 of the present invention.

1: luminance/color-difference transformation section
2: color area determination section
3: first boundary signal correction section
4: second boundary signal correction section
5: correction integration section
6: correction adjustment section

BEST MODE FOR CARRYING OUT THE INVENTION

Embodiment 1

FIG. 1 is a block diagram illustrating a color correction device according to Embodiment 1 of the present invention. In FIG. 1, the color correction device is configured with a luminance/color-difference transformation section 1, a color area determination section 2, a first boundary signal correction section 3, a second boundary signal correction section 4, a correction integration section 5, and a correction adjustment section 6. Among these, the color area determination section 2 corresponds to a component constituting a color area determination unit. The first boundary signal correction section 3, the second boundary signal correction section 4, and the correction integration section 5 correspond to components constituting a signal correction unit. Next, the operation will be described.

The luminance/color-difference transformation section 1 converts an RGB signal obtained from an image capture element into a luminance signal and color signals of any format of YCbCr, YUV, L*a*b*, L*u*v*, and HSV. A case in which the luminance/color-difference transformation section 1 converts an RGB signal into a YCbCr signal will be described below.

Figures 2, 3:
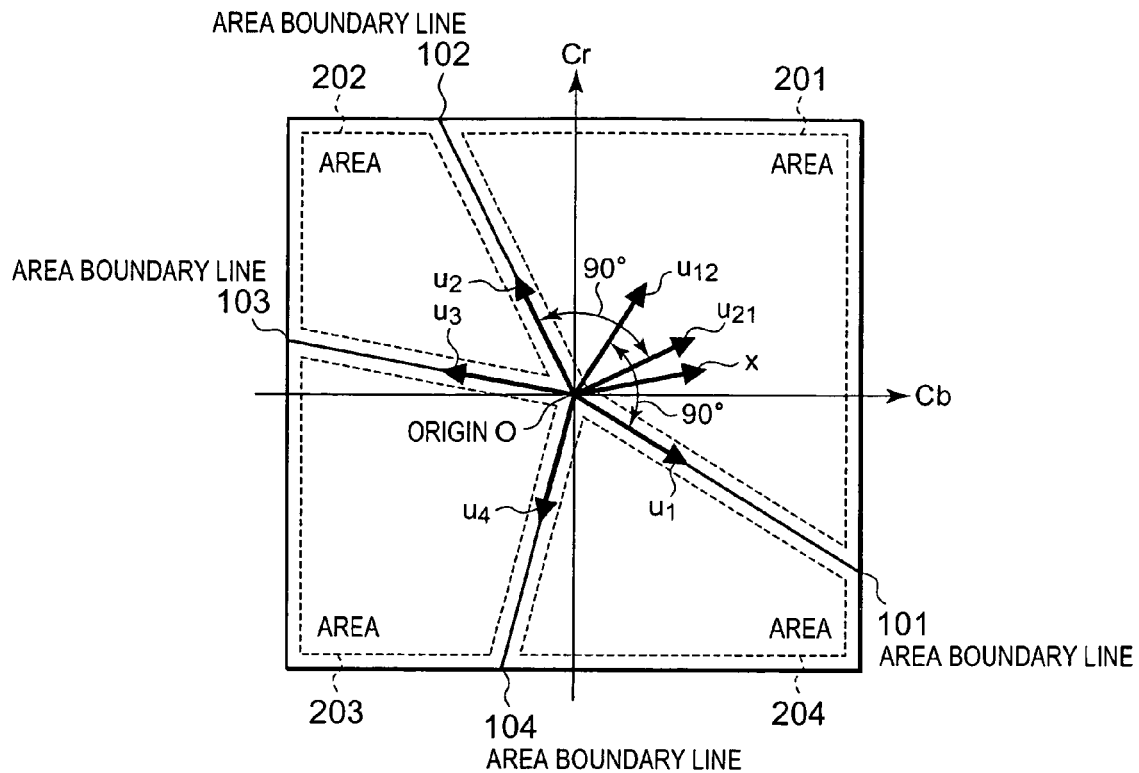
FIG. 2 is a diagram illustrating an example of color plane areas according to Embodiment 1 of the present invention.
FIG. 3 is a diagram illustrating corresponding relations between expressive forms of color signals and saturation calculation methods.

The color area determination section 2 is a component corresponding to a color area determination unit, and determines the area in which a color signal is present. Here, a method of determining a color area in the color area determination section 2 will be described in reference to a diagram. In FIG. 2, four area boundary lines 101, 102, 103, and 104 starting at the origin of the CbCr plane are provided here. The area boundary lines divide the CbCr plane into an area 201, an area 202, an area 203, and an area 204 as illustrated in the diagram.

In addition, it is assumed that a vector from the origin along the area boundary line 101 is $u_1$, a vector from the origin along the area boundary line 102 is $u_2$, a vector from the origin along the area boundary line 103 is $u_3$, and a vector from the origin along the area boundary line 104 is $u_4$. The vectors $u_1$, $u_2$, $u_3$, and $u_4$ are referred to as area-defining vectors. More specifically, the vectors $u_1$ and $u_2$ are vectors defining the area 201, the vectors $u_2$ and $u_3$ are vectors defining the area 202, the vectors $u_3$ and $u_4$ are vectors defining the area 203, and the vectors $u_4$ and $u_1$ are vectors defining the area 204.

Given that a vector generated from the $u_1$ rotated 90 degrees in the direction toward the area boundary line 102 is expressed as $u_{12}$, and a vector generated from the $u_2$ rotated 90 degrees in the direction toward the area boundary line 101 is expressed as $u_{21}$, when a color signal vector $x=(Cb, Cr)^T$ is present in the area 201, the inner products of the vector x and the vector $u_{12}$, and of the vector x and the vector $u_{21}$ satisfy formulas (1).

[Expressions 1]

$$u_{12} \cdot x \geq 0 \text{ and } u_{21} \cdot x \geq 0 \tag{1}$$

In the same manner, when the vector x is present in the area 202, the following formulas are satisfied.

[Expressions 2]

$$u_{23} \cdot x \geq 0 \text{ and } u_{32} \cdot x \geq 0 \tag{2}$$

When the vector x is present in the area 203, the following formulas are satisfied.

[Expressions 3]

$$u_{34} \cdot x \geq 0 \text{ and } u_{43} \cdot x \geq 0 \tag{3}$$

When the vector x is present in the area 204, the following formulas are satisfied.

[Expressions 4]

$$u_{41} \cdot x \geq 0 \text{ and } u_{14} \cdot x \geq 0 \tag{4}$$

It should be noted that "T" means transpose of a vector in the above description.

As described above, the color area determination section 2 calculates the inner products of the color signal vector and each of orthogonal vectors with respect to the vectors defining the areas 201, 202, 203, and 204, and determines in series whether the resultant inner products satisfy any condition of formulas (1) through formulas (4), to determine the area in which the color signal vector is present. Conclusively, the color area determination section 2 outputs, as information for identifying the area in which the color signal vector x is present, two area-defining vectors out of the vectors $u_1$, $u_2$, $u_3$, and $u_4$ as a first area-defining vector and a second area-defining vector. The first area-defining vector is inputted to the first boundary signal correction section 3, and the second area-defining vector is inputted to the second boundary signal correction section 4.

Next, the first boundary signal correction section 3 and the second boundary signal correction section 4 perform correction of the inputted luminance signal Y and color signals Cb and Cr based on the two area-defining vectors calculated by the color area determination section 2. Here, it is assumed that the first area-defining vector is $u_i$, the second area-defining vector is $u_j$, correction matrices for $u_i$ and $u_j$ are $A_i$ and $A_j$ respectively, and the results corrected according to the color correction matrices $A_i$ and $A_j$ are $(Y_i', Cb_i', Cr_i')$ and $(Y_j', Cr_j', Cb_j')$ respectively. The first boundary signal correction section 3 and the second boundary signal correction section 4 perform operations as expressed in formula (5) and formula (6) to correct the luminance signal Y and the color signals Cb and Cr.

[Expression 5]

$$\begin{pmatrix} Y_i' \\ Cb_i' \\ Cr_i' \\ 1 \end{pmatrix} = A_i \begin{pmatrix} Y \\ Cb \\ Cr \\ 1 \end{pmatrix} \tag{5}$$

$$\begin{pmatrix} Y_j' \\ Cb_j' \\ Cr_j' \\ 1 \end{pmatrix} = A_j \begin{pmatrix} Y \\ Cb \\ Cr \\ 1 \end{pmatrix} \tag{6}$$

Here, the $A_i$ in formula (5) is given by formulas (7). In addition, the $A_j$ is obtained by replacing the suffixes i in formulas (7) with j.

[Expression 6]

$$A_i = \begin{pmatrix} U_i & V_i \\ O & 1 \end{pmatrix} \quad U_i = \begin{pmatrix} a_i & b_i & c_i \\ d_i & e_i & f_i \\ g_i & h_i & i_i \end{pmatrix} \quad V_i = \begin{pmatrix} j_i \\ k_i \\ l_i \end{pmatrix} \tag{7}$$

In formulas (7), the color correction matrix $A_i$ is composed of a matrix component $U_i$ for performing linear transformation and a matrix component $V_i$ for performing parallel translation. Such transformation is known as affine transformation. Each component of the $U_i$ for performing linear transformation is determined by the characteristics of the color filters on the image capture elements and by correction amounts for re-creating as memorized colors. For each component of the $V_i$ for performing parallel translation, the amount of correction is determined in accordance with achromatic color shifts.

The correction integration section 5 integrates the correction result from the first boundary correction section 3 and the correction result from the second boundary correction section 4 with weights based on distance relationships between the signal vector and the area boundary lines. More specifically, given that the correction results from the first boundary correction section 3 are $p_i'=(Y_i', Cb_i', Cr_i')^T$ and $p_j'=(Y_j', Cb_j', Cr_j')^T$, and the distances between the vector x and the area boundary lines for defining the area in which the vector x is present are $h_i$ and $h_j$, synthesis expressed in formula (8) is performed, to obtain a signal vector $p_s=(Y_s, Cb_s, Cr_s)^T$ as a synthetic result.

[Expression 7]

$$p_s = \frac{h_j}{h_i + h_j} p'_i + \frac{h_i}{h_i + h_j} p'_j \tag{8}$$

In formula (8), the distance $h_i$ is calculated according to formula (9).

[Expression 8]

$$h_i = \sqrt{\frac{|\vec{x}|^2 \cdot |\vec{u}_i|^2 - (\vec{x} \cdot \vec{u}_i)^2}{|\vec{u}_i|^2}} \tag{9}$$

When the luminance signal and the saturation are included in predetermined value ranges, the correction adjustment section 6 adopts and outputs the correction result $p_s$ calculated using formula (8) by the correction integration section 5 as a final correction result. Moreover, when the luminance signal and the saturation are not included within the predetermined value ranges, the correction adjustment section adjusts the degree of contribution of the correction result $p_s$ for the input signal vector $p=(Y, Cb, Cr)^T$, and outputs the adjusted values as a final correction result.

The following is a specific explanation of the above-described processing. Specifically, the correction adjustment section 6 calculates the saturation C according to formula (10).

[Expression 9]

$$C=\sqrt{Cb^2+Cr^2} \tag{10}$$

The correction adjustment section 6 determines whether the saturation C is included within a predetermined value range where C1 is the lower limit and C2 is the upper limit. Here, C1 and C2 are values that have been designated in advance from the S/N ratio of the image capture elements such as CCDs. Moreover, the correction adjustment section 6 determines based on the determination result a coefficient $k_s$ as described in formula (11) through formula (13).

[Expression 10]

If $0 \leq C < C1$, then $k_s = \frac{C}{C1}$ (11)

If $C1 \leq C \leq C2$, then $k_s = 1$ (12)

If $C2 < C \leq C\text{MAX}$, then $k_s = \frac{C\text{MAX} - C}{C\text{MAX} - C2}$ (13)

Here, the case in which formula (12) is applied corresponds to a case in which the saturation C is included within a predetermined value range. Moreover, the case in which formula (11) is applied is a case in which the saturation C is too low to be included in the value range. Furthermore, the case in which formula (13) is applied is a case in which the saturation C is too high to be included in the value range. In addition, CMAX in formula (13) is the maximum saturation value.

Then the correction adjustment section 6 calculates $p_s'$ according to formula (14) using the coefficient $k_s$ determined as above.

[Expression 11]

$$p_s' = k_s \times p_s + (1 - k_s) \times p \tag{14}$$

Next, the correction adjustment section 6 corrects based on the luminance signal Y the $p_s'$ calculated according to formula (14). For that purpose, the correction adjustment section 6 firstly determines whether the luminance signal Y is included within a predetermined value range where Y1 is the lower limit and Y2 is the upper limit. Here, Y1 and C2 are values that have been designated in advance from the S/N ratio of the image capture elements such as CCDs. Moreover, the correction adjustment section 6 determines based on the determination result a coefficient $k_y$ as described in formula (15) through formula (17).

[Expression 12]

If $0 \leq Y < Y1$, then $k_y = \frac{Y}{Y1}$ (15)

If $Y1 \leq Y \leq Y2$, then $k_y = 1$ (16)

If $Y2 < Y \leq Y\text{MAX}$, then $k_y = \frac{Y\text{MAX} - Y}{Y\text{MAX} - Y2}$ (17)

Here, the case in which formula (16) is applied corresponds to a case in which the luminance signal Y is included within a predetermined value range. Moreover, the case in which formula (15) is applied is a case in which the luminance signal Y is too low to be included in the value range. Furthermore, the case in which formula (17) is applied is a case in which the luminance signal Y is too high to be included in the value range. In addition, YMAX in formula (17) is the maximum value of the luminance signal.

Then the correction adjustment section 6 calculates $p_y''$ according to formula (18) using the coefficient $k_y$ determined as above.

[Expression 13]

$$p_s'' = k_y \times p_s' + (1 - k_y) \times p \tag{18}$$

Although the explanations have been made for the case in which the luminance/color-difference transformation section 1 converts an RGB signal into luminance and color signals of YCbCr, other expressive forms such as YUV, L*a*b*, L*u*v*, and HSV can be used. When the conversion is performed into each of the expressive forms, the saturation is expressed as described in the table illustrated in FIG. 3. Similar correction processing is performed for each expressive form, and the correction can be performed while carrying out correction suppression processing for the saturation and the luminance.

As described above, in a color correction method according to Embodiment 1 of the present invention, there is a benefit in that, using a correction matrix including a parallel translation component, color correction can be performed while correcting color shifts.

Moreover, there is a benefit in that, using weighting based on distances to boundary, lines for dividing the color area, color correction in which the color smoothly, varies from the boundaries can be realized. Furthermore, there is a benefit in that, by calculating the ratio of the signal after correction to the signal before correction using the magnitudes of the luminance and the saturation, the correction with respect to signals having low luminance or low saturation is adjusted, so that increase of the S/N ratio can be suppressed.

It should be noted that, although in the present Embodiment 1 an example has been described in which the CbCr plane is divided into four areas, the number of partitions of the area is not limited to four, but can be an arbitrary number.

Embodiment 2

In Embodiment 1, the correction integration section 5 calculates the distances between an input vector x and area boundary lines defining a CbCr plane area in which the vector x is present, and performs weighting based on the calculated distances, to realize continuity of corrections results in the area boundaries. However, in order to calculate the distances used for weighting, square-root operations are required, so that the computation load sometimes becomes high. Therefore, in Embodiment 2, a color correction device that can perform weighting operations equivalent to Embodiment 1 without performing square-root operations will be described.

Figure 4:
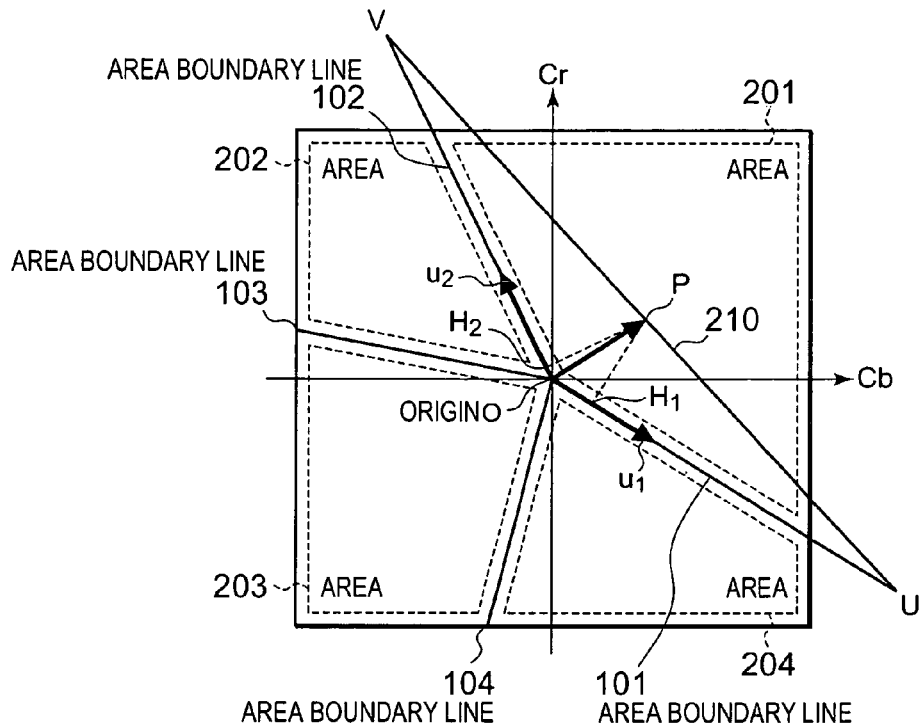
FIG. 4 is a diagram illustrating an example of color plane areas according to Embodiment 2 of the present invention.

Here, the processing in the correction integration section 5 in Embodiment 2 will be described in reference to FIG. 4. It is assumed that configurations of the rest of the components are similar to those of the color correction device in Embodiment 1, so that the explanation of each component will be omitted. In FIG. 4, it is assumed that a color signal vector x is present within an area 201, the end point of the color signal vector is P, the feet of perpendicular lines from the end point P to area boundary lines 101 and 102 are H1 and H2, and, given a line 210 passing through the P, intersecting points of the line 210 with the area boundary lines 101 and 102 are U and V.

Given that the line 210 is drawn such that the distances between the origin O of the CbCr plane and the intersecting points U and V (lengths of the line segment OU and the line segment OV) are equal to each other, the triangle OUV is an isosceles triangle, so that ∠OUV=∠OVU. In addition, $H_1$ is the foot of the perpendicular line from P to the area boundary line 101, and $H_2$ is the foot of the perpendicular line from P to the area boundary line 102, so that ∠$PH_1$U=∠$PH_2$V. Therefore, the triangle $PH_1$U and the triangle $PH_2$V are similar.

Here, it is assumed that the horizontal coordinate of each point is expressed using a suffix x, and the vertical coordinate is expressed using a suffix y. Specifically, the coordinates of P, U, and V are expressed as ($P_x$, $P_y$), ($U_x$, $U_y$), and ($V_x$, $V_y$). In this case, the following expression is satisfied.

[Expression 14]

$$\overline{PU}:\overline{PV}=\overline{P_xU_x}:\overline{P_xV_x}=\overline{P_yU_y}:\overline{P_yV_y} \quad (19)$$

Here, $U_x$, $U_y$, $V_x$, and $V_y$ are given by formulas (20).

[Expression 15]

$$U_x = \frac{P_x k_y - P_y k_x}{k_{u1}} u_{1x}, \quad U_y = \frac{P_x k_y - P_y k_x}{k_{u1}} u_{1y}$$

$$V_x = \frac{P_x k_y - P_y k_x}{k_{u2}} u_{2x}, \quad V_y = \frac{P_x k_y - P_y k_x}{k_{u2}} u_{2y} \quad (20)$$

where $k_x$, $k_y$, $k_{u1}$, and $k_{u2}$ are given by formulas (21)

[Expression 16]

$$k_x = |u_1|u_{2x} - |u_2|u_{1x}, \quad k_y = |u_1|u_{2y} - |u_2|u_{1y},$$

$$k_{u1} = u_{1x}k_y - u_{1y}k_x, \quad k_{u2} = u_{2x}k_y - u_{2y}k_x \quad (21)$$

Therefore, the distance weighting coefficients in formula (8) are calculated according to formula (22).

[Expression 17]

$$\frac{h_2}{h_1 + h_2} = \frac{\overline{VP}}{\overline{UV}} = \frac{\overline{V_xP_x}}{\overline{U_xV_x}} = \frac{\overline{V_yP_y}}{\overline{U_yV_y}} \quad (22)$$

$$\frac{h_1}{h_1 + h_2} = \frac{\overline{UP}}{\overline{UV}} = \frac{\overline{U_xP_x}}{\overline{U_xV_x}} = \frac{\overline{U_yP_y}}{\overline{U_yV_y}}$$

Values of $U_x$, $U_y$, $V_x$, $V_y$, $k_x$, $k_y$, $k_{u1}$, and $k_{u2}$ given by formula (20) and formula (21) are uniquely determined when the area boundary lines for the area are fixed. Therefore, when the area partitioning is determined, these values are calculated at the same time, and the calculation results are stored. Moreover, the weighting coefficients can be calculated according to formula (22) using $U_x$, $U_y$, $V_x$, and $V_y$ stored during the color correction. Accordingly, the weighting coefficients can be calculated without performing square-root operations, so that the amount of computations can be reduced.

As described above, in a color correction device according to Embodiment 2 of the present invention, when adjusting the level of correction in accordance with the distances between the point of the color signal and the area boundary lines dividing the color signal plane into areas, the weighting coefficients are calculated only from combinations of additions and subtractions based on geometric relations between the point of the color signal and the area boundary lines instead of distance computations requiring square-root operations, so that the amount of computations can be reduced.

Embodiment 3

Figure 5:
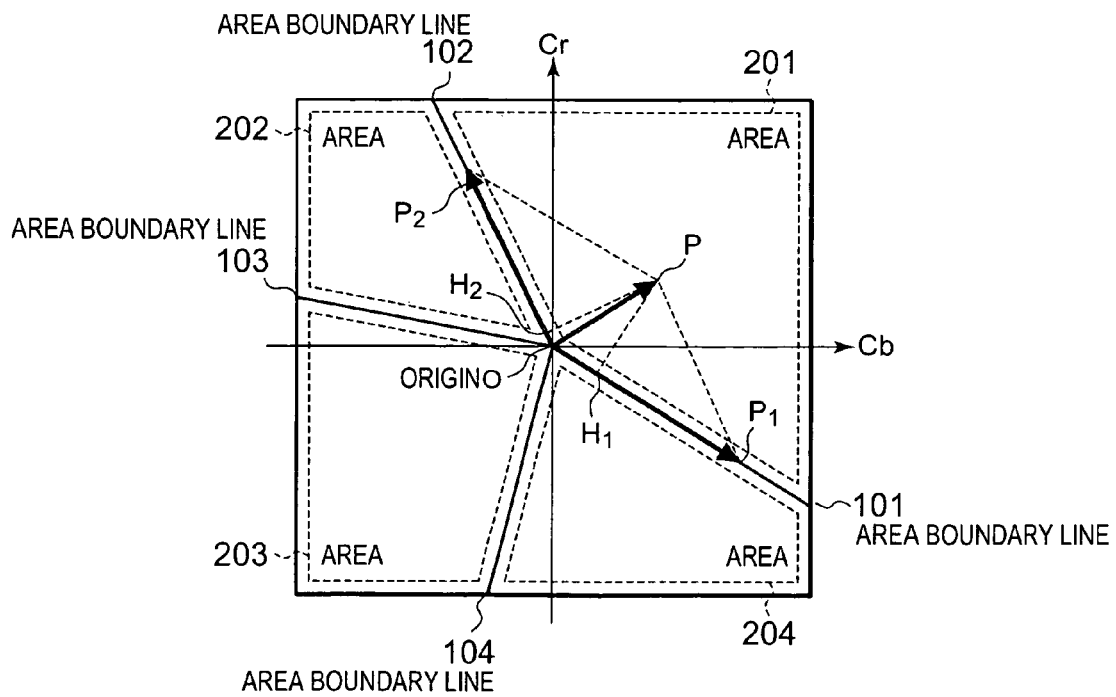
FIG. 5 is a diagram illustrating an example of color plane areas according to Embodiment 3 of the present invention.

Here, the processing in the correction integration section in Embodiment 3 will be described in reference to FIG. 5. When the color signal vector P is present within an area 201 partitioned with an area boundary line 101 and an area boundary line 102, the color signal vector P is resolved into vectors being parallel to the area boundary line 101 and to the area boundary line 102, respectively. Given that the ends of the vectors are $P_1$ and $P_2$, respectively, where the start of the vectors is the origin O, $P_1$ is a point along the area boundary line 101, and $P_2$ is a point along the area boundary line 102, and meanwhile the quadrangle $OP_1PP_2$ is a parallelogram.

Therefore, the following expressions are obtained.

[Expressions 18]

$$\overline{OP_1} = \overline{PP_2}, \quad \overline{OP_2} = \overline{PP_1} \quad (23)$$

Given that the feet of the perpendicular lines from the point P to the area boundary line 101 and to the area boundary line 102 are $H_1$ and $H_2$, respectively, the triangle $PH_1P_1$ and the triangle $PH_2P_2$ are similar, so that the following expression is obtained.

[Expressions 19]

$$\overline{PH_1}:\overline{PH_2}=\overline{PP_1}:\overline{PP_2} \quad (24)$$

Therefore, the distance weighting coefficients in formula (8) are expressed as follows.

[Expression 20]

$$\frac{h_2}{h_1 + h_2} = \frac{\overline{OP_1}}{\overline{OP_1} + \overline{OP_2}} \quad (25)$$

$$\frac{h_1}{h_1 + h_2} = \frac{\overline{OP_2}}{\overline{OP_1} + \overline{OP_2}}$$

Here, given that the vector defining the area boundary line 101 is $u_1 = (u_{1x}, u_{1y})^T$, and the vector defining the area boundary line 102 is $u_2 = (u_{2x}, u_{2y})^T$, the lengths of line segments $OP_1$ and $OP_2$ are given by formula (26) and formula (27).

[Expression 21]

$$\overline{OP_1} = \frac{u_{2y}P_x - u_{2x}P_y}{D}|u_1| \quad (26)$$

$$\overline{OP_2} = \frac{u_{1x}P_y - u_{1y}P_x}{D}|u_2| \quad (27)$$

However, in formula (26) and formula (27), D is expressed by the following expression.

[Expressions 22]

$$D = u_{1x}u_{2y} - u_{2x}u_{1y} \quad (28)$$

In formula (28), the value D is uniquely determined if the area-defining direction vectors are determined. Therefore, if the value is set at the same time in the area partitioning, or once the value is obtained by calculation, the amount of computations can be reduced.

As described above, in a color correction method according to Embodiment 3 of the present invention, there is a benefit in that, regarding weighting of the distances to boundary lines dividing the color area, by resolving the position vector of the color signal into two directions of adjacent boundary lines, and by using the magnitudes of the vectors of each direction as weighting coefficients, square-root operations are not required in calculating distances, so that the amount of computations can be reduced.

Embodiment 4

In the color area determination section 2 in Embodiment 1, the boundaries for the hue direction are defined by direction vectors, the orthogonal vectors corresponding to the direction vectors are obtained, and the color area with respect to the hue is determined from the results of calculating the inner products of the orthogonal vectors and the color signal vector. However, instead of that, the color area can be determined by the inner products of the color signal vector and the direction vectors.

Given that the angle between the direction vectors $u_i$ and $u_j$ defining a color area is $\theta$, and the angles between the vectors and the color signal vector x are $\alpha$ and $\beta$, respectively, when $\alpha < \theta$ and $\beta < \theta$ are satisfied, the color signal vector x is assumed to be present within the area defined by the $u_i$ and the $u_j$. Here, the angles $\alpha$, $\beta$, and $\theta$ are smaller than 180 degrees, so that $\cos \alpha < \cos \theta$ and $\cos \beta < \cos \theta$ are true. From the above, the following expressions are derived.

[Expression 23]

$$\frac{x \cdot u_i}{|x||u_i|} < \frac{u_i \cdot u_j}{|u_i||u_j|} \text{ and } \frac{x \cdot u_j}{|x||u_j|} < \frac{u_i \cdot u_j}{|u_i||u_j|} \quad (29)$$

Therefore, the following expressions are obtained.

[Expression 24]

$$\frac{x \cdot u_i}{|x|}|u_j| < u_i \cdot u_j \text{ and } \frac{x \cdot u_j}{|x|}|u_i| < u_i \cdot u_j \quad (30)$$

When the conditions according to the formulas (30) are satisfied, the color signal vector x is assumed to be present within the boundaries defined by the $u_i$ and the $u_j$. Therefore, without obtaining the orthogonal vectors, the color area can be determined by determining whether the conditions are satisfied.

INDUSTRIAL APPLICABILITY

The present invention can be broadly applied to imaging devices such as digital cameras and in performing correction of image data being the results taken by such imaging devices.

What is claimed is:

1. A color correction method of correcting a color signal vector, comprising the steps of:
    determining to which area of a color signal plane divided by area boundary lines passing through the origin of the color signal plane an inputted color signal vector belongs and outputting first and second boundary lines defining an area determined to include the color signal vector; and
    converting the color signal vector using a correction matrix having been designated in advance with respect to the area determined to include the color signal vector;
    wherein a correction matrix including a component for performing parallel translation and a component for performing linear transformation is used as said correction matrix;
    wherein a signal correction unit converts the color signal vector using a first area boundary line correction matrix and a second area boundary line correction matrix as said correction matrices including components for performing parallel translation and components for performing linear transformation, and integrates a transformation result by the first area boundary line correction matrix and a transformation result by the second area boundary line correction matrix, to obtain the resultant corrected color signal vector.

2. A color correction device, for determining to which area of a color signal plane divided by area boundary lines passing through the origin of the color signal plane an inputted color signal vector belongs, and converting tile color signal vector using a correction matrix having been designated in advance with respect to the area determined to include the color signal vector, correcting the color signal vector, the device comprising:
    a color area determination unit configured to determine to which area of the color signal plane divided by the area boundary lines passing through the origin of the color signal plane the inputted color signal vector belongs and configured to output first and second area boundary lines defining the area determined to include the color signal vector;

a signal correction unit converts the color signal vector using a first area boundary line correction matrix and a second area boundary line correction matrix as said correction matrices including components for performing parallel translation and components for performing linear transformation, and integrates a transformation result by the first area boundary line correction matrix and a transformation result by the second area boundary line correction matrix, to obtain the resultant corrected color signal vector.

3. A color correction device according to claim 2, wherein the signal correction unit integrates the transformation result by the first area boundary line correction matrix and the transformation result by the second area boundary line correction matrix with weights based on distance relations between the inputted color signal vector and the boundary lines of the color signal plane area determined to include the color signal vector, to obtain the resultant corrected color signal vector.

4. A color correction method according to claim 1, of correcting a color signal vector, comprising the steps of:

determining to which area of a color signal plane divided by area boundary lines passing through the origin of the color signal plane an inputted color signal vector belongs and outputting first and second boundary lines defining an area determined to include the color signal vector; and converting the color signal vector using a correction matrix having been designated in advance with respect to the area determined to include the color signal vector;

wherein a correction matrix including a component for performing parallel translation and a component for performing linear transformation is used as said correction matrix;

wherein a signal correction unit integrates the transformation result by the first area boundary line correction matrix and the transformation result by the second area boundary line correction matrix with weights based on distance relations between the inputted color signal vector and the boundary lines of the color signal plane area determined to include the color signal vector, to obtain the resultant corrected color signal vector.

* * * * *